(12) United States Patent
Jhuo et al.

(10) Patent No.: US 9,074,127 B2
(45) Date of Patent: Jul. 7, 2015

(54) HEAT RADIATING MATERIAL

(71) Applicants: Yu Sian Jhuo, New Taipei (TW); Kuo Hsun Chen, Toufen Town (TW); Yi An Sha, New Taipei (TW)

(72) Inventors: Yu Sian Jhuo, New Taipei (TW); Kuo Hsun Chen, Toufen Town (TW); Yi An Sha, New Taipei (TW)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 0 days.

(21) Appl. No.: 14/135,778

(22) Filed: Dec. 20, 2013

(65) Prior Publication Data

US 2015/0008360 A1  Jan. 8, 2015

(30) Foreign Application Priority Data

Jul. 4, 2013  (TW) .............................. 102123910 A

(51) Int. Cl.
*C09K 5/14* (2006.01)
*C09K 11/02* (2006.01)

(52) U.S. Cl.
CPC ................. *C09K 11/025* (2013.01); *C09K 5/14* (2013.01)

(58) Field of Classification Search
None
See application file for complete search history.

(56) References Cited

U.S. PATENT DOCUMENTS

2014/0191263 A1*  7/2014  Wang et al. ..................... 257/98

\* cited by examiner

*Primary Examiner* — Necholus Ogden, Jr.
(74) *Attorney, Agent, or Firm* — Egbert Law Offices, PLLC

(57) ABSTRACT

A heat radiating material contains components which comprise 10-45 wt % of titanium dioxide, 5-25 wt % of zirconium dioxide, 2-30 wt % of magnesium oxide, and 0.01-0.5 wt % of an oxide of rare earth metal. The heat radiating material has a heat conductivity of 0.34-1.35 W/m-K, and a radiation efficiency equal to or larger than 88% which is measured in infrared spectroscopy wavelength range 4-14 μm and at a temperature of 40° C.

9 Claims, No Drawings

HEAT RADIATING MATERIAL

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present application relates to a heat radiating material, and more particularly to a heat radiating material with superior heat conductivity and radiation efficiency.

2. Description of Related Art Including Information Disclosed Under 37 CFR 1.97 and 37 CFR 1.98.

Electronic devices, light emitting diode (LED) lights or other components that give out heat are likely to be restricted to ambient temperatures, environments or spaces, so their heat is hard to be dissipated via heat conduction or convention. Therefore, heat radiation is considered to increase heat transfer efficacy.

LEDs have advantages of small size, easy design and low power consumption, but LEDs generates high heat when they are lightened. The high heat causes LED luminous decay. Therefore, it is important to reduce the temperature of the LEDs in order to increase the luminous efficiency and the lifetime. Especially, when the LEDs are applied to downlights or light bulbs, the shells of the lights restrict heat transfer. Thus, the LED?applications of high power, high brightness and compact site are limited.

Heat radiation to transfer heat may use traditional far-infrared radiating material such as ceramics containing aluminum oxide, titanium dioxide, or silicon dioxide. However, heat conductivity of the traditional material is not high enough, thus it is hard to obtain optimal comprehensive effect associating with heat convention and conduction even if the radiating material has good radiating efficiency. Therefore, the radiating material has limitations to the applications of high heat devices such as LED devices, and cannot obtain optimal comprehensive heat dissipating efficiency.

BRIEF SUMMARY OF THE INVENTION

A material at a temperature of higher than −273° C. in which electrons vibrate more violently with the increase of temperature. Particles collide in the vibration and as a result the electrons absorb energy to be in excited state. The outer electronics of higher energy level may leave from the original orbit to a higher orbit. However, the electronics in the higher orbit are not stable and are likely to return to the original orbit, i.e., electrons tend to go to lower level. When electrons return to the lower orbit, quantum energy is generated to release radiating energy. For the material with high radiating capability, radiation can be output in the form of infrared. Therefore, any subjects at a temperature higher than absolute zero degree generate infrared radiation. With various molecular structures and temperatures, radiating materials generate infrared of different radiating wavelengths. When atoms or atomic groups in molecules in high-energy vibrating state to low-energy vibrating state, they will generate far-infrared of wavelength of 2.5-25 μm. If radiation is caused by molecular rotation, far-infrared radiation of a wavelength greater than 25 μm will be generated. According to experiments, the energy of vibrating spectrum is about 100 times the energy of rotating spectrum. It is advantageous to use high-energy waveband of 2.5 to 25 μm in far-infrared radiation.

Heat transfer mechanisms include heat conduction, convection and radiation. In order to dissipate heat to ambient environment effectively, all the heat transfer mechanisms need to be taken into account as a whole. For example, high heat conductive material is used to increase heat conduction, or heat dissipation fins are applied to the shell of an LED light to increase heat convection. It is preferably to consider the interactions among those heat transfer mechanisms to achieve optimal comprehensive heat dissipation efficiency.

The present application discloses a heat radiating material with superior heat conduction and radiation efficiency. The radiating material provides comprehensive effect of heat dissipation, and therefore is suitable for being applied to high heat devices.

In accordance with the present application, a heat radiating material or a so-called infrared radiating material comprises a combination of components comprising 10% to 45% by weight of titanium oxide, 5% to 25% by weight of zirconium oxide, 2% to 30% by weight of magnesium oxide, and 0.01% to 0.5% by weight of an oxide of rare earth metal. The heat radiating material has a heat conductivity of 0.34-1.5 W/m-K, and a radiation efficiency of equal to or greater than 88%, which is measured in infrared spectroscopy wavelength range of 4-14 μm and at a temperature of 40° C.

In an embodiment, the components are dispersed in a polymer. The polymer comprises 10% to 75% by weight of the heat radiating material.

In an embodiment, the components comprise 40-70% by weight of the heat radiating material, and the sum of titanium oxide and zirconium oxide comprise 35-60% by weight of the heat radiating material.

In an embodiment, the components have an average particle size in the range of 0.1-30 μm.

In an embodiment, the oxide of rare earth metal comprises yttrium oxide, lanthanum oxide, neodymium oxide or Mixture thereof.

Moreover, the heat radiating material may further comprise leveling agent, deformer, coupling agent, or mixture thereof, if desired.

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

According to the present application, a heat radiating material uses ceramic powders of P type and N type to generate infrared when they are heated. More specifically, the ceramic powders capable of emitting infrared of different wavebands are employed. For example, titanium oxide is capable of emitting infrared of medium waveband to long waveband, e.g., 7-20 μm, and capable of reflecting infrared. Zirconium oxide is capable of emitting infrared of short waveband to medium waveband, e.g., less than 7 μm. Magnesium oxide may be further used to increase heat conductivity of the polymer mixture, by which the heat of electronic devices can rapidly heat up the heat radiating material. With the rapid increase of the temperature, the heat radiating material can enhance the heat radiating efficiency. Moreover, an oxide of rare earth metal such as yttrium oxide, lanthanum oxide, neodymium oxide or mixture thereof is added to decrease the excited levels of ceramic powders.

The components given in Table 1 are mixed in a polymer to form the heat radiating material. Table 1 shows four embodiments (Em. 1-4) and two comparative examples (Comp 1-2) without adding magnesium oxide, in which the data indicates weight ratios of the components. The components comprise titanium oxide of a particle size of 0.1-0.3 μm, zirconium oxide of a particle site of about 0.3 μm, magnesium oxide of a particle site of 0.1-0.3 μm, lanthanum oxide of about 0.3 μm, yttrium oxide of about 0.3 μm and neodymium oxide of about 0.3 μm. In practice, the components have particle sizes of 0.1-30 μm, or may be 3 μm, 5 μm, 10 μm or 20 μm.

The components given in Table 1 of 50 parts by weight and high density polymer of 50 parts by weight are mixed, and then are blended in Haake-600 with a rotation speed of 60 rpm and a temperature of 200° C. for 10 minutes to form pellets. The pellets are pressed to form lamellas which are hot-pressed thereafter to form a plate of 1.5 mm thickness. The plate is cut into specimens of 13 mm×13 mm. The infrared tests of those specimens are measured by infrared radiation spectrometer VERTEX™ 70FT-IR made by Bruker Optik GmpH at 40° C. A radiation efficiency R is calculated with each measurement value radiance in wavelength range 4-14 μm as a ratio thereof to the ideal radiance of a black body at a temperature of 40° C.

In practice, the polymer mixed with components may comprise thermoset epoxy and/or thermoplastic. The thermoset epoxy comprises acrylic, epoxy, phenolic resins, unsaturated polyester, polyurethane or mixture thereof. The thermoplastic comprises polyethylene (PE), polypropylene (PP), polycarbonate (PC), polybutylene terephthalate (PBT), polyethylene terephthalate (PET), acrylonitrile butadiene styrene (ABS), polyphenylene sulfide (PPS), polyvinyl chloride (PVC), polyvinylalcohol (PVA), polyetheretherketone (PEEK), polyoxymethylene (POM), polysulfone (PSF), polyethersulfone (PES), polystyrene (PS), polyphenylene oxide (PPO), polyurethane (PU), polyamide (PA), polyimide (PI), polyetherimide (PEI), polyetherimide (PEI), polyetherimide/silicone block copolymer, phenoxy resin, polyester resin, acrylic resin or mixture thereof.

TABLE 1

|  | Comp 1 | Comp 2 | Em 1 | Em 2 | Em 3 | Em 4 |
|---|---|---|---|---|---|---|
| $TiO_2$ | 55 | 30 | 55 | 50 | 50 | 50 |
| $ZrO_2$ | 45 | 20 | 40 | 40 | 35 | 25 |
| MgO | — | 50 | 5 | 10 | 15 | 25 |
| $Y_2O_3$ | 0.1 | 0.1 | 0.1 | 0.1 | — | 0.1 |

TABLE 1-continued

|  | Comp 1 | Comp 2 | Em 1 | Em 2 | Em 3 | Em 4 |
|---|---|---|---|---|---|---|
| $La_2O_3$ | 0.1 | 0.1 | — | 0.1 | 0.1 | 0.1 |
| $Nd_2O_3$ | 0.1 | 0.1 | 0.1 | — | 0.1 | 0.1 |
| Heat conductivity (W/m-K) | 0.32 | 0.8 | 0.34 | 0.49 | 0.54 | 0.64 |
| Thermal resistance (K/W) | 0.487 | 0.194 | 0.432 | 0.315 | 0.281 | 0.244 |
| R (%) | 87.1 | 85.5 | 88.5 | 90.3 | 92.1 | 93.8 |

It can be seen from Table 1 that among those embodiments Em 4 shows higher heat conductivity and radiation efficiency. Because Comp 1 does not contain magnesium oxide, it has lower heat conductivity and radiation efficiency. Although Comp 2 contains a lot of magnesium oxide, the weight ratio of titanium oxide and zirconium oxide is relatively low. As a result, the heat conductivity of Comp 2 can increase significantly, but the radiation efficiency becomes low.

Table 2 shows other embodiments modified from Em 4 with different weight ratios of the components and polymer. The data indicates weight ratios.

TABLE 2

|  | Em 4 | Em 5 | Em 6 |
|---|---|---|---|
| Polymer | 50 | 70 | 15 |
| $TiO_2$ | 25 | 15 | 42.5 |
| $ZrO_2$ | 12.5 | 7.5 | 21.3 |
| MgO | 12.5 | 7.5 | 21.3 |
| $Y_2O_3$ | 0.1 | 0.1 | 0.1 |
| $La_2O_3$ | 0.1 | 0.1 | 0.1 |
| $Nd_2O_3$ | 0.1 | 0.1 | 0.1 |
| Heat conductivity (W/m-K) | 0.64 | 0.34 | 1.2 |
| Thermal resistance (K/W) | 0.244 | 0.501 | 0.129 |
| R (%) | 93.8 | 88.1 | 95.5 |

It can be seen from Em 5 of Table 2 that lower weight ratio of the components, i.e., higher weight ratio of the polymer, results in lower heat conductivity and radiation efficiency. In contrast, Em 6 of Table 2 shows that higher weight ratio of the components, i.e., lower weight ratio of the polymer, results in higher heat conductivity and radiation efficiency. It should be noted that the material would become brittle if there is a lot of the components. Such material has to be restricted to applications without concern of brittleness. The components may comprise 40-70% by weight of the heat radiating material. That is, the polymer may comprise 30-60% by weight of the heat radiating material. The sum of the titanium oxide and zirconium oxide may comprise 35-60% by weight of the radiating material. Accordingly, the radiating material can attain comprehensive performance in terms of mechanical property, heat conductivity and radiation efficiency.

The embodiments in Tables 1 and 2 are illustrative only. In practice, the polymer may comprise 10-75%, or 25%, 35%, 45%, 55% in particular, by weight of the heat radiating material. Titanium oxide may comprise 10-45%, or 20%, 30%, 40% in particular, by weight of the combined components of the heat radiating material. Zirconium oxide may comprise 5-25%, or 10%, 15%, 20% in particular, by weight of the combination of components of the heat radiating material. Magnesium oxide may comprise 2-30%, or 5%, 10%, 20% in particular, by weight of the combination of components of the heat radiating material.

It can be seen from Tables 1 and 2 that the radiation efficiency of all embodiments can be 88%, 90% or up to 95%.

The embodiments of adding magnesium oxide can increase the heat conductivity to 0.34-1.5 W/m-K, or 0.5-1 Wm-K in particular. It is observed from Table 1 that if the magnesium oxide comprises 7% of the radiating material, the heat conductivity is greater than 0.5 W/m-K. The heat conductivity of the radiating material of the present application may be 0.6 W/m-K, 0.8 W/m-K, 1 W/m-K or 1.2 Wm-K. The corresponding thermal resistances of Em 1 to Em 6 are between 0.1 to 0.6 K/W, and may be 0.2K/W, 0.3K/W, 0.4K/W.

The addition of magnesium oxide to the radiating material can increase heat conductivity significantly, and also increase infrared radiation efficiency if it contains adequate weight ratio of magnesium oxide (Em 1 to Em 4). The heat radiating material considers comprehensive effect of radiation efficiency and heat conductivity, and mechanical property may be further considered if needed.

The material of Em 4 is coated on the shell of an LED light bulb of which luminous flux and luminous efficiency are measured and compared to another LED light bulb without coating, and the results are shown in Table 3. Apparently, the LED light bulb coated with radiating material has higher luminous flux and luminous efficiency.

TABLE 3

|  | Luminous flux (lm) | Luminous efficiency (lm/W) |
|---|---|---|
| Without coating | 695 | 67 |
| With coating | 731 | 71 |

In summary, titanium oxide and zirconium oxide are used to generate infrared rays of different wavebands, and magnesium oxide is used to increase the heat conductivity of the polymer mixture. As such the heat of the electronic devices can heat up the components rapidly. The increase of temperature of the heat radiating material can increase heat radiation efficiency to achieve superior heat dissipation efficacy in terms of heat conduction and radiation.

The above-described embodiments of the present invention are intended to be illustrative only. Numerous alternative embodiments may be devised by persons skilled in the art without departing from the scope of the following claims.

We claim:

1. A heat radiating material for coating onto an object for heat dissipation, the heat radiating material comprising a combination of components comprising:
   10-45% by weight of titanium oxide;
   5-25% by weight of zirconium oxide;
   2-30% by weight of magnesium oxide operable to increase heat conductivity of the heat radiating material; and
   0.01-0.5% by weight of an oxide of a rare earth metal operable to decrease excited levels of titanium oxide and zirconium oxide;
   wherein the heat radiating material has a heat conductivity of 0.34 to 1.5 W/m-K and a radiation efficiency of equal to or greater than 88% which is measured in an infrared spectroscopy wavelength range of 4-14 μm and at a temperature of 40° C., wherein the combination of components comprises an amount of P-type and N-type components sufficient to generate infrared.

2. The heat radiating material of claim 1, further comprising a polymer in which the components are dispersed therein.

3. The heat radiating material of claim 2, wherein the heat radiating material comprises 10-75% by weight of the polymer.

4. The heat radiating material of claim 1, wherein heat radiating material comprises 40-70% by weight of the components, and 35-60% by weight of the titanium oxide and the zirconium oxide.

5. The heat radiating material of claim 1, wherein the components have an average particle size of 0.1-30 μm.

6. The heat radiating material of claim 1, wherein the oxide of rare earth metal comprises yttrium oxide, lanthanum oxide, neodymium oxide or a mixture thereof.

7. The heat radiating material of claim 1, wherein the heat radiating material has a thermal resistance of 0.1-0.6K/W.

8. The heat radiating material of claim 1, wherein the heat radiating material has a heat conductivity of 0.5-1 W/m-K.

9. The heat radiating material of claim 2, further comprising a leveling agent, a deformer, a coupling agent, or a mixture thereof.

* * * * *